United States Patent
Kim et al.

(10) Patent No.: US 7,860,514 B2
(45) Date of Patent: Dec. 28, 2010

(54) METHOD FOR TRANSMITTING COMMON CONTROL INFORMATION IN A WIRELESS MOBILE COMMUNICATION SYSTEM

(75) Inventors: Yong-Seok Kim, Suwon-si (KR); June Moon, Seoul (KR); Soon-Young Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 735 days.

(21) Appl. No.: 11/762,846

(22) Filed: Jun. 14, 2007

(65) Prior Publication Data
US 2007/0293234 A1 Dec. 20, 2007

(30) Foreign Application Priority Data
Jun. 14, 2006 (KR) ...................... 10-2006-0053446

(51) Int. Cl.
*H04W 74/00* (2009.01)
*H04W 36/00* (2009.01)
(52) U.S. Cl. ...................... 455/455; 455/436
(58) Field of Classification Search ................. 455/553, 455/436, 455
See application file for complete search history.

(56) References Cited

U.S. PATENT DOCUMENTS

| 5,229,995 | A | * | 7/1993 | Strawczynski et al. | ...... 455/517 |
| 5,546,443 | A | * | 8/1996 | Raith | .......................... 455/450 |
| 7,346,352 | B2 | * | 3/2008 | Colban et al. | ................ 455/442 |
| 2004/0085926 | A1 | | 5/2004 | Hwang et al. | |
| 2004/0203734 | A1 | | 10/2004 | Ishii | |
| 2006/0030309 | A1 | * | 2/2006 | Lee et al. | ...................... 455/434 |
| 2006/0092881 | A1 | * | 5/2006 | Laroia et al. | ................. 455/436 |
| 2008/0285500 | A1 | * | 11/2008 | Zhang et al. | ................. 455/517 |

FOREIGN PATENT DOCUMENTS

| KR | 10-2003-0029310 A | 4/2003 |
| KR | 10-2004-0016540 A | 2/2004 |

* cited by examiner

*Primary Examiner*—Kent Chang
*Assistant Examiner*—Kashif Siddiqui
(74) *Attorney, Agent, or Firm*—Jefferson IP Law, LLP

(57) ABSTRACT

A method for transmitting common control information in a wireless mobile communication system is provided. The method includes transmitting common control information by a first Base Station (BS) to a second BS and broadcasting by the second BS the common control information received from the first BS. Accordingly, transmission of the control information by the second BS saves time and frequency resources in the communication system.

7 Claims, 6 Drawing Sheets

METHOD FOR TRANSMITTING COMMON CONTROL INFORMATION IN A WIRELESS MOBILE COMMUNICATION SYSTEM

PRIORITY

This application claims the benefit under 35 U.S.C. §119 (a) of a Korean patent application filed in the Korean Intellectual Property Office on Jun. 14, 2006 and assigned Serial No. 2006-53446, the entire disclosure of which is hereby incorporated by reference.

BACKGROUND OF THE INVENTION

1. Field of the Invention

The present invention generally relates to a method for managing resources in a wireless mobile communication system. More particularly, the present invention relates to a method for transmitting common control information by a Base Station (BS).

2. Description of the Related Art

Provisioning of services with diverse Quality of Service (QoS) requirements at or above 100 Mbps to users is an active study area for a future-generation communication system called a $4^{th}$ Generation (4G) wireless mobile communication system.

For high-speed data transmission, the 4G wireless mobile communication system can adopt Orthogonal Frequency Division Multiplexing (OFDM) and Orthogonal Frequency Division Multiple Access (OFDMA).

Data is transmitted in frames, each having a MAP zone with control information, a DownLink (DL) burst zone, and an UpLink (UL) burst zone. The DL and UL burst zones are defined by frequency and time.

The control information is delivered in MAP Information Elements (IEs) and Mobile Stations (MSs) acquire system information and resource allocation information from the MAP IEs.

If a BS has more data bursts to be transmitted, the size of the MAP IEs that provide resource allocation information about the data bursts increases. This means that the DL burst zone needs to be decreased in size. On the contrary, for fewer data bursts, the size of the MAP IEs is decreased, thus saving time and frequency resources.

SUMMARY OF THE INVENTION

An aspect of the present invention is to address at least the above-mentioned problems and/or disadvantages and to provide at least the advantages described below. Accordingly, an aspect of the present invention is to provide a method for efficiently managing radio resources in a wireless mobile communication system.

Another aspect of the present invention is to provide a method for increasing transmission efficiency by distributing MAP overhead in a wireless mobile communication system.

In accordance with an aspect of the present invention, a method for transmitting common control information in a wireless mobile communication system is provided. The method includes transmitting common control information by a first Base Station (BS) to a second BS and broadcasting, by the second BS, the common control information received from the first BS.

In accordance with another aspect of the present invention, a method for distributing common control information in a serving BS in a wireless mobile communication system is provided. The method includes determining, by the serving BS, a ratio between transmission data and common control information that a plurality of Mobile Stations (MSs) are commonly to receive, requesting distribution of the common control information to the neighbor BS, if the ratio exceeds a threshold, receiving a response for the common control information distribution request from the neighbor BS, and transmitting common control information to be distributed to the neighbor BS, if the response indicates that the neighbor BS accepts the common control information distribution request.

In accordance with a further aspect of the present invention, a method for distributing common control information in a serving BS in a wireless mobile communication system is provided. The method includes receiving, by the serving BS, a first CQI between the serving BS and a Mobile Station (MS), receiving a second CQI between the MS and the neighbor BS, determining whether to distribute the common control information to the neighbor BS based on the first and second CQIs, negotiating the common control information distribution with the neighbor BS, and transmitting common control information to be distributed to the neighbor BS if the neighbor BS accepts the common control information distribution.

In accordance with still another aspect of the present invention, a method for distributing common control information in a serving BS in a wireless mobile communication system is provided. The method includes receiving, by the serving BS, a common control information distribution request from the MS, determining whether to distribute the common control information to the neighbor BS, and transmitting common control information to be distributed to the neighbor BS.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method for increasing transmission efficiency in which, if a traffic load is equal to or larger than a threshold, a serving Base Station (BS) transmits all or part of MAP IEs with common control information to a neighbor BS. The neighbor BS includes the received MAP IEs in its MAP zone, thereby distributing MAP overhead. The MAP overhead is defined as the ratio of resources occupied for a MAP to the total available resources of a transmission frame.

Figure 1A:
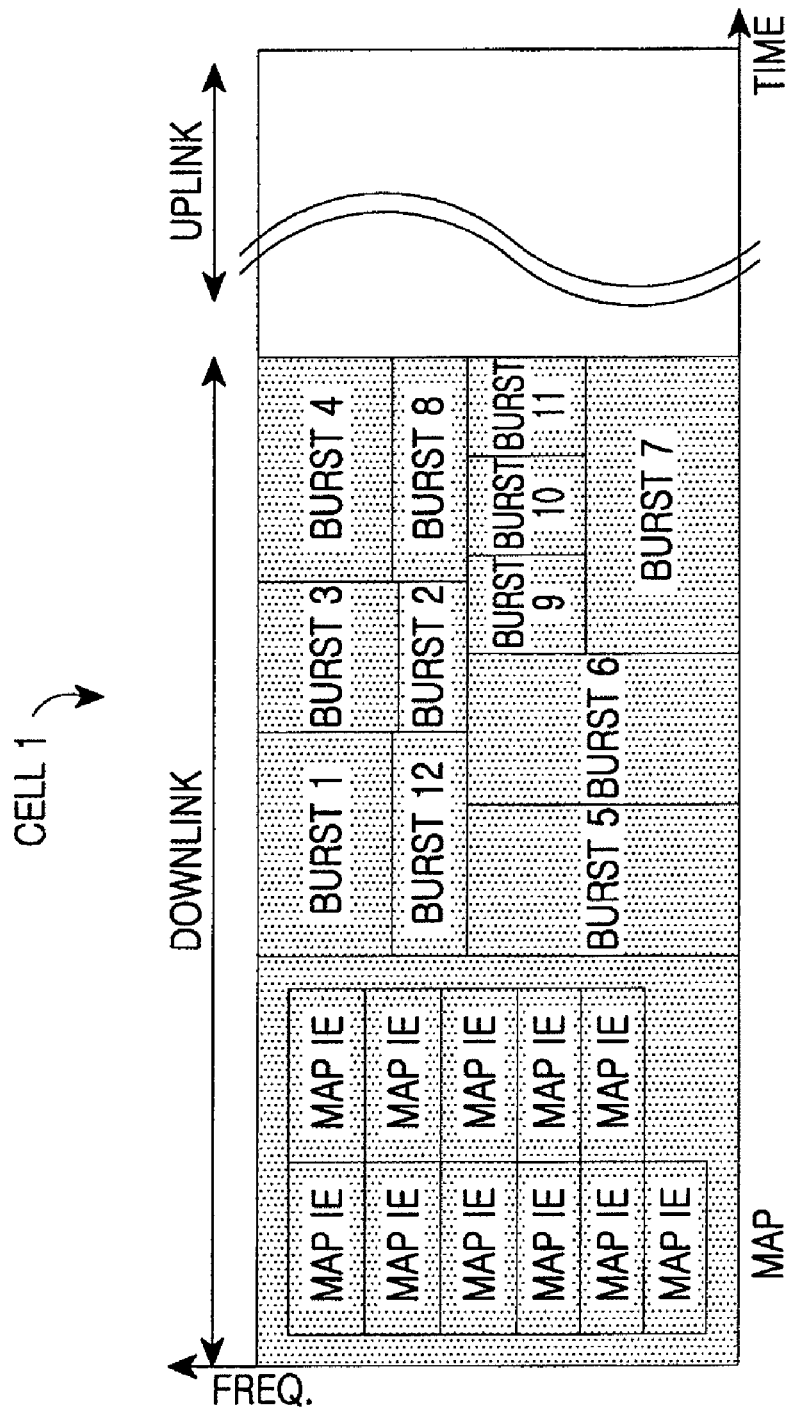
FIGS. 1A, 1B and 1C illustrate an operation for managing MAP IEs to distribute MAP overhead according to an exemplary embodiment of the present invention.
Figure 1B:
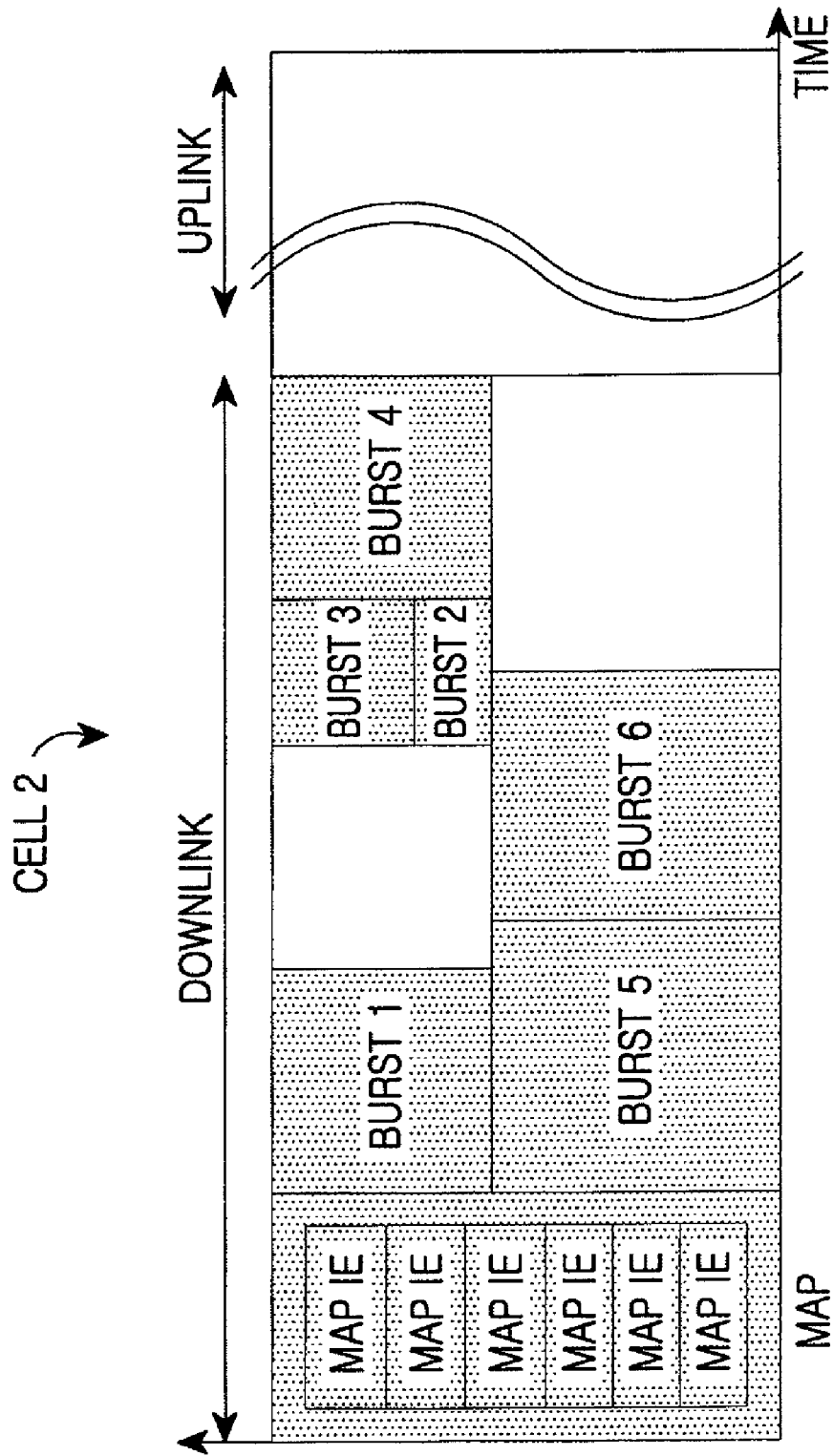
Figure 1C:
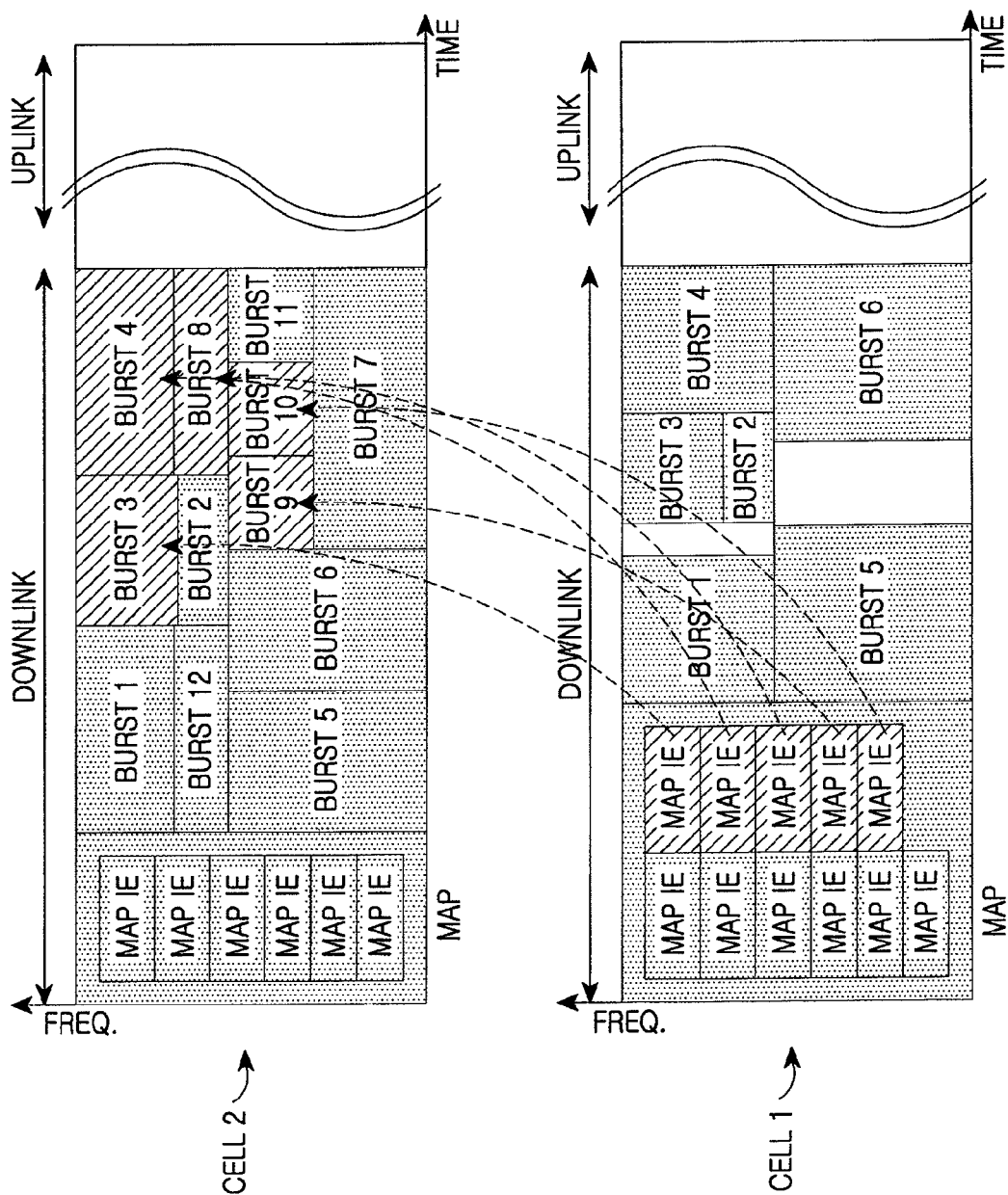

FIGS. 1A, 1B and 1C illustrate an operation for managing MAP IEs to distribute MAP overhead according to an exemplary embodiment of the present invention.

FIG. 1A illustrates a frame structure with many data bursts and thus many MAP IEs in a first cell (cell 1) and FIG. 1B illustrates a frame structure with a few data bursts and thus a few MAP IEs in a second cell (cell 2). Therefore, as illustrated in FIG. 1C, some MAP IEs of cell 1 are included in a MAP zone of cell 2 so as to increase the transmission efficiency of cell 1 and cell 2.

Table 1 and Table 2 illustrate the formats of a DL_MAP IE and a UL_MAP IE, respectively according to an exemplary embodiment of the present invention.

TABLE 1

| Syntax | Size | Notes |
|---|---|---|
| DL_MAP IE{ | | |
| DIUC | | |
| Cell ID/Sector ID | | |
| If(INC_CID==1){ | | |
| N_CID | | |
| For(n=0; n<N_CID; n++){ | | |
| If(SubMAP){ | | |
| RCID | | |
| } | | |
| Else { | | |
| CID | | |
| } | | |
| } | | |
| } | | |
| OFDMA Symbol offset | | |
| Sub_Channel offset | | |
| Boosting | | |
| No. OFDMA Symbols | | |
| No. Sub_Channels | | |
| Repetition coding indication | | |
| } | | |

TABLE 2

| Syntax | Size | Notes |
|---|---|---|
| UL_MAP IE { | | |
| CID | | |
| Cell ID/Sector ID | | |
| UIUC | | |
| Duration | | |
| Repetition coding indication | | |
| } | | |

An exemplary DL_MAP IE and UL_MAP IE of the present invention further include Cell Identifier (ID)/Sector ID, compared to a conventional DL_MAP IE and UL_MAP IE.

Figure 2:
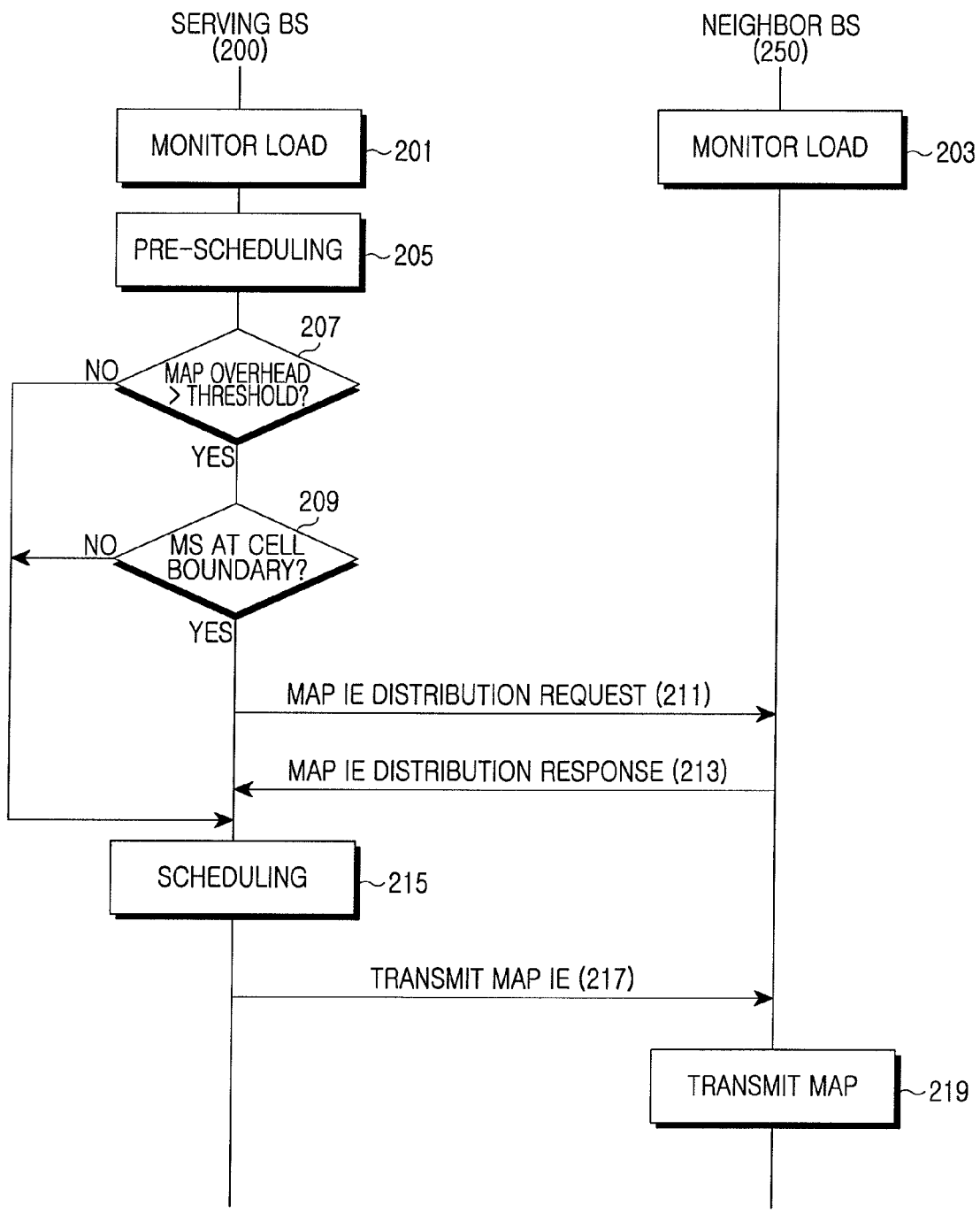
FIG. 2 is a flowchart illustrating an operation for distributing MAP overhead between a serving Base Station (BS) and a neighbor BS in a wireless mobile communication system according to an exemplary embodiment of the present invention.

FIG. 2 is a flowchart illustrating an operation for distributing MAP overhead between a serving BS and a neighbor BS in a wireless mobile communication system according to an exemplary embodiment of the present invention.

Referring to FIG. 2, a serving BS 200 and a neighbor BS 250 monitor the transmission load of each cell or sector in steps 201 and 203. In step 205, the serving BS 200 performs pre-scheduling by estimating the size of data bursts and the size of UL/DL_MAP IEs to be transmitted.

The serving BS 200 compares a MAP overhead from the pre-scheduling with a threshold in step 207. If the MAP overhead is greater than or equal to the threshold, the serving BS 200 determines whether a Mobile Station (MS) is located at a cell boundary in step 209.

If the MS is located at a cell boundary, the serving BS 200 transmits a MAP IE distribution request message to the neighbor BS 250 in step 211. The MAP distribution request message requests inclusion of all or part of MAP IEs of the serving BS 200 in the MAP zone of the neighbor BS 250.

The neighbor BS 250 replies with a MAP IE distribution response message including information about the size of MAP IEs that it can accommodate in step 213.

When the neighbor BS 250 can accommodate MAP IEs of the serving BS 200, the serving BS 200 schedules the data bursts and the remaining MAP IEs except for the MAP IEs that can be accommodated by the neighbor BS 250 in step 215. In step 217, the serving BS 200 forwards the MAP IEs that the neighbor BS 250 can accommodate to the neighbor BS 250. The neighbor BS 250 transmits the received MAP IEs to the MS in a MAP message in step 219. If the MAP IE distribution response message indicates that the neighbor BS 250 cannot accommodate any MAP IE of the serving BS 200, the serving BS 200 performs scheduling without MAP IE distribution in step 215.

Figure 3:
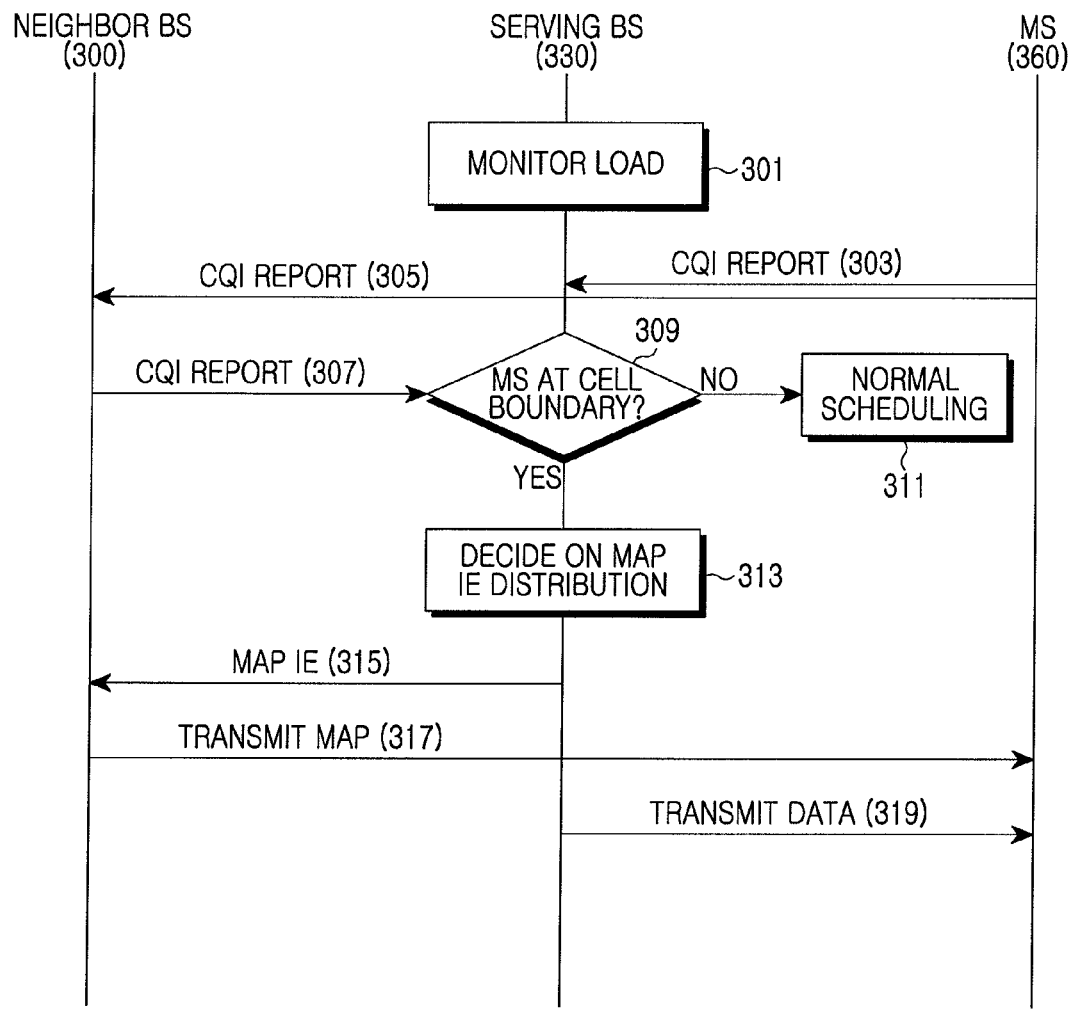
FIG. 3 is a diagram illustrating a signal flow for an operation for distributing MAP overhead for a Mobile Station (MS) located at a cell boundary according to an exemplary embodiment of the present invention.

FIG. 3 is a diagram illustrating a signal flow of an operation for distributing MAP overhead for an MS located at a cell boundary according to an exemplary embodiment of the present invention.

Referring to FIG. 3, a serving BS 330 monitors the transmission load of a cell or a sector in step 301. An MS 360 transmits Channel Quality Information (CQI) representing the channel statuses between the MS 360 and a neighbor BS 300 and between the MS 360 and the serving BS 330 in steps 303 and 305. In step 307, the neighbor BS 300 transmits the CQI representing the channel status between the neighbor BS 300 and the MS 360 to the serving BS 330.

In step 309, the serving BS 330 determines whether the MS 360 is located at a cell boundary based on the CQI received from the neighbor BS 300. If the absolute value of the difference between the CQI representing the channel status between the MS 360 and the serving BS 330, CQIs and the CQI representing the channel status between the MS 360 and the neighbor BS 300, CQIn is below a threshold, as expressed in Equation (1), the serving BS 330 determines that the MS 360 is located at the cell boundary.

$$If\ |CQI_s-CQI_n|<Threshold,\ MS\ at\ cell\ boundary \qquad (1)$$

which means that the channel status between the serving BS 330 and the MS 360 is almost the same as the channel status between the neighbor BS 300 and the MS 360.

If the MS 360 is not located at the cell boundary, the serving BS 330 performs a normal scheduling operation without MAP IE distribution in step 311.

On the other hand, if it is determined that the MS 360 is at the cell boundary, the serving BS 330 can decide on MAP IE distribution according to its MAP overhead in step 313. In an exemplary embodiment, the serving BS 330 decides to distribute its MAP IEs to the neighbor BS 300. Thus, the serving BS 330 transmits all or part of the MAP IEs to the neighbor BS 300 in step 315. The size of MAP IEs to be distributed may be determined by negotiations between the serving BS 330 and the neighbor BS 300.

The neighbor BS 300 transmits a MAP message with the distributed MAP IEs to the MS 360 in step 317 and the serving BS 330 transmits data to the MS 360 in step 319.

Figure 4:
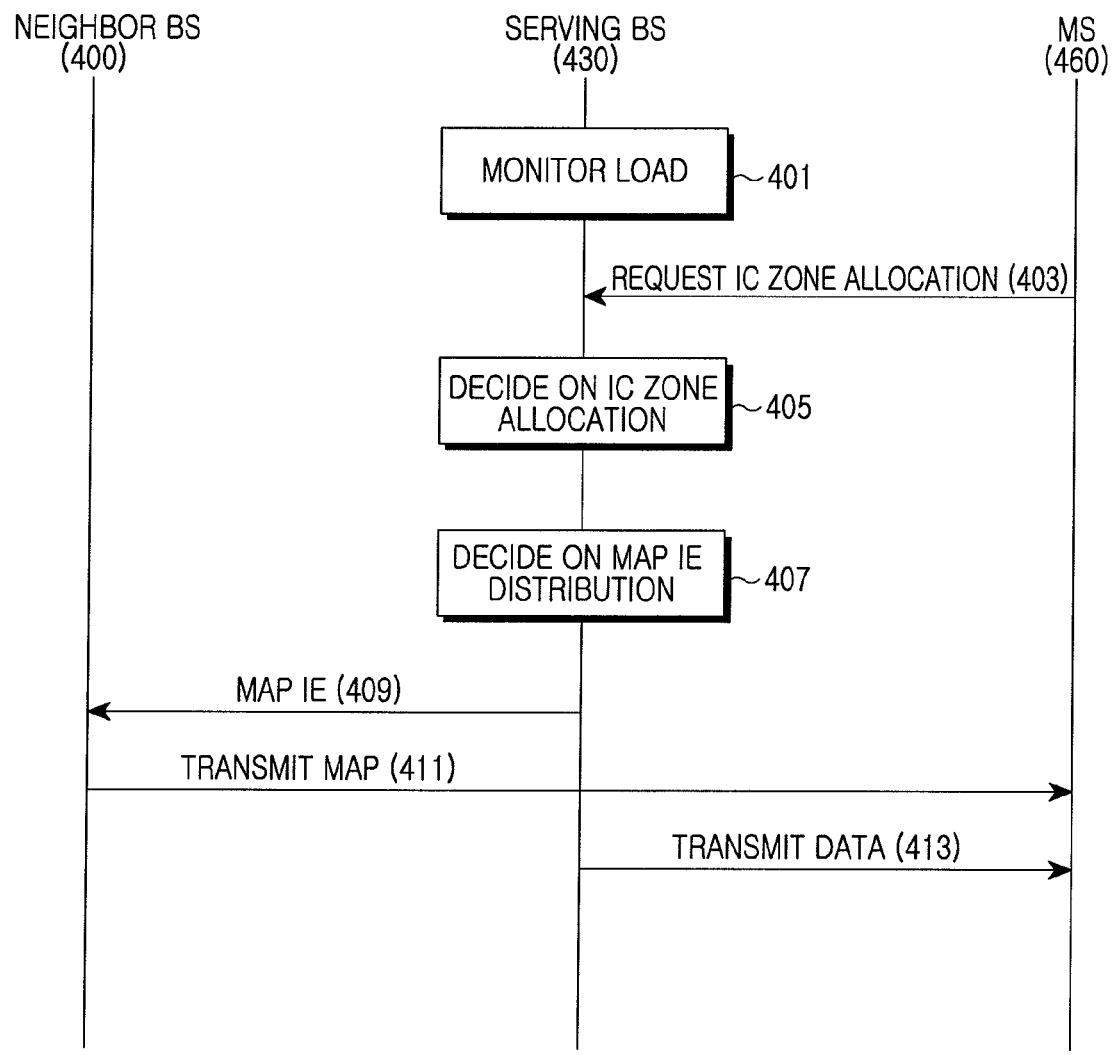
FIG. 4 is a diagram illustrating a signal flow for an operation for distributing MAP overhead in a wireless mobile communication system having an Interference Cancellation (IC) zone according to an exemplary embodiment of the present invention.

FIG. 4 is a diagram illustrating a signal flow for an operation of distributing MAP overhead in a wireless mobile communication system having an IC zone according to an exemplary embodiment of the present invention.

Referring to FIG. 4, a serving BS 430 monitors the transmission load of a cell or a sector in step 401. An MS 460 requests IC zone allocation to the serving BS 430 in order to minimize interference reception in step 403. It is noted that an IC zone is a resource allocation area for interference cancellation. That is, the IC zone allocation request is equivalent to a request for MAP IE distribution.

The serving BS 430 determines whether to allocate an IC zone, taking into account an interference situation in step 405. In an exemplary embodiment, the serving BS 430 determines to allocate the IC zone and determines to distribute its MAP IEs to a neighbor BS 400 in step 407. Hence, the serving BS 430 transmits all or part of its MAP IEs to the neighbor BS 400 in step 409. In an exemplary embodiment, the serving BS 430 determines the size of MAP IEs to be distributed by negotiating with the neighbor BS 400 before transmitting the MAP IEs to the neighbor BS 400.

The neighbor BS 400 transmits a MAP message to the MS 460 in step 411 and the serving BS 430 transmits data to the MS 460 in step 413.

While the serving BS decides on MAP IE distribution without receiving a request from the MS in the example illustrated in FIG. 3, the MS recognizes that it is located at a cell boundary and requests IC zone allocation to the serving BS so that the serving BS decides on MAP IE distribution in the example illustrated in FIG. 4.

As is apparent from the above description, exemplary embodiments of the present invention advantageously increases data transmission efficiency by distributing MAP IEs of a first BS with a large amount of transmission data to a second BS with a small amount of transmission data.

While the invention has been shown and described with reference to certain exemplary embodiments, it will be understood by those skilled in the art that various changes in form and details may be made therein without departing from the spirit and scope of the present invention as defined by the appended claims and their equivalents.

What is claimed is:

1. A method for transmitting common control information in a wireless mobile communication system, comprising:
   comparing, by a first Base Station (BS), a traffic load with a predetermined threshold;
   transmitting, by the first BS, common control information to a second BS that the traffic load is below the predetermined threshold, when the traffic load is larger than the predetermined threshold; and
   broadcasting, by the second BS, the common control information.

2. The method of claim 1, wherein the common control information comprises a MAP Information Element (IE).

3. The method of claim 2, wherein the MAP IE comprises at least one of an Identifier (ID) of the second BS and a sector ID of the second BS.

4. A method for distributing common control information in a serving Base Station (BS) in a wireless mobile communication system, the method comprising:
   determining a ratio between transmission data and common control information that a plurality of mobile stations (MSs) are to receive;
   requesting distribution of the common control information to a neighbor BS if the ratio exceeds a threshold;
   receiving a response to the common control information distribution request from the neighbor BS; and
   transmitting common control information to be distributed to the neighbor BS, if the response indicates that the neighbor BS accepts the common control information distribution request.

5. The method of claim 4, wherein the threshold comprises an overhead threshold.

6. The method of claim 4, further comprising performing scheduling on remaining common control information which comprises common control information not to be distributed to the neighbor BS.

7. The method of claim 4, wherein the requesting comprises requesting the common control information distribution to the neighbor BS, if at least one of the plurality of MSs is located at a cell boundary.

\* \* \* \* \*